Nov. 14, 1967    J. V. FISHER    3,352,195
SELF-RETAINED NUT WITH IMPERFORATE HEAD
Filed Dec. 16, 1965
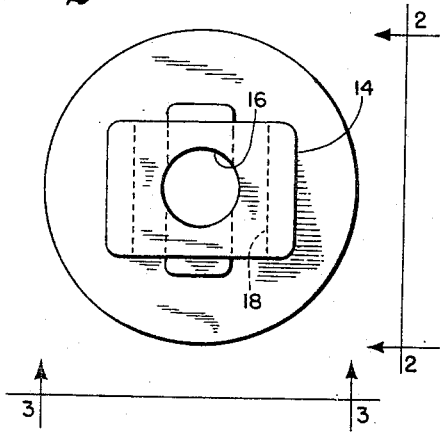
Fig. 1
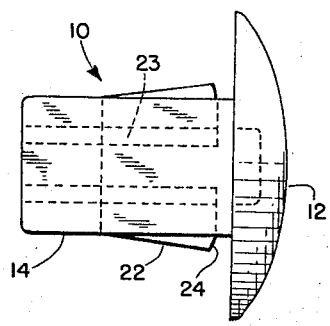
Fig. 2
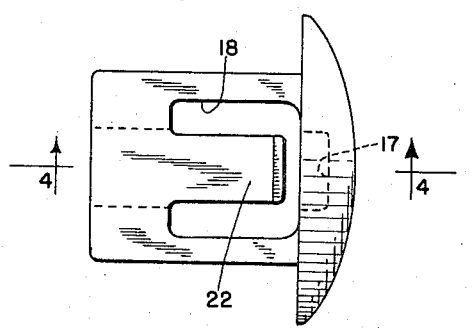
Fig. 3
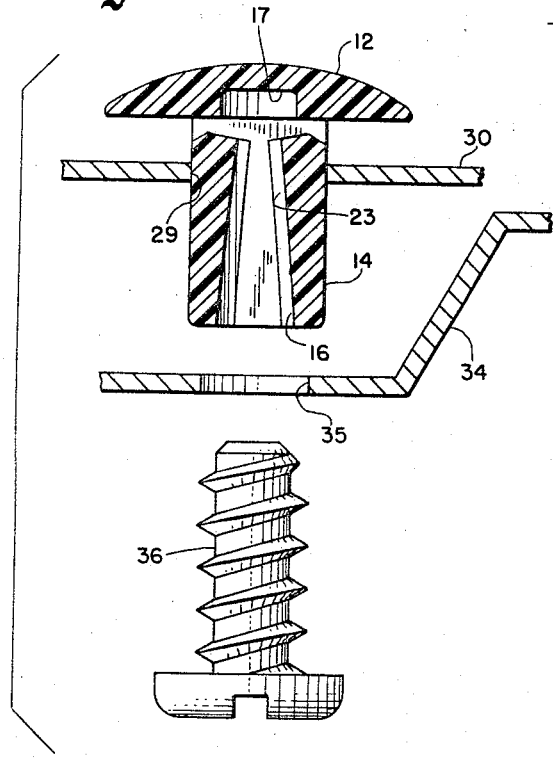
Fig. 4
Fig. 5
INVENTOR.
Julian V. Fisher
BY
His Att'ys United States Patent Office 3,352,195
Patented Nov. 14, 1967

3,352,195
SELF-RETAINED NUT WITH IMPERFORATE HEAD
Julian V. Fisher, Carpentersville, Ill., assignor to Illinois Tool Works Inc., Chicago, Ill., a corporation of Delaware
Filed Dec. 16, 1965, Ser. No. 514,267
1 Claim. (Cl. 85—80)

ABSTRACT OF THE DISCLOSURE

A one piece dielectric nut member having an imperforate head and a non-circular shank depending from the head. The shank being provided with means to retain the nut in a complementary aperture of a workpanel. A bore extends within the shank from the end opposite to the head for acceptance of a screw member with the screw member being adapted to lock the retaining means in installed position.

---

In the fastener art it has been found desirable to have a fastener capable of mounting one apertured member in spaced relation to another apertured member with the fastener serving to seal the aperture of the first member relative to its exterior environment. An example of the need for such a fastener exists in clothes dryers where it is necessary to fasten supporting brackets to the dryer drum for retaining secondary means on said drum and with the fastener providing a smooth imperforate exposed surface which will not snag or tear the clothing with which it comes into contact. Additionally, it has been found desirable to have such a fastener serve as a dielectric spacer whereby the secondary means bracket is insulated from the dryer drum and its surrounding environment. Such a fastener is formed in the embodiment of the present invention and includes a one piece dielectric member having an imperforate head for sealing, a non-circular shank with relatively resilient means for mounting the fastener in a complementary aperture in said first member and a bore for the acceptance of a screw member for the mounting of said secondary means bracket.

It is an object of the present invention to provide means for fastening one panel in spaced relation to a second member with the aperture accepting such fastener means in the first panel being covered.

Another object of the invention is to provide a one-piece thermoplastic fastener capable of accepting secondary fastening means, such as a screw, to mount a panel in spaced relation to a second member with screw means telescopically accepted within such fastener for securing said second member.

Still another object is to provide a thermoplastic fastener which is simple in design and economical to fabricate and which is readily adaptable to use in mass production techniques.

Other objects will be apparent to those skilled in the art when the specification is read in conjunction with the accompanying drawing wherein:

FIG. 1 is a bottom end view of a device embodying the principles of the present invention;

FIG. 2 is a side elevation of the device shown in FIG. 1 which is viewed along line 2—2 in FIG. 1;

FIG. 3 is a second side elevation with the device of FIG. 1 rotated ninety degrees from the view of FIG. 2 as seen along lines 3—3 of FIG. 1;

FIG. 4 is an exploded view showing the application of the device to a panel member in conjunction with a second member and a screw threaded fastener, said device being in section taken along line 4—4 of FIG. 3; and FIG. 5 is an elevation in partial section showing the final mounted position of the device embodying the teachings of the invention.

Referring now to the drawing, a device 10 embodying the teachings of this invention includes an imperforated head 12 having a smooth curved upper surface and a flat under surface with the radial extremities of the head being relatively thin.

Extending integrally from the under or clamping surface of the head is a shank 14, preferably polygonal in shape, for purposes best set forth hereinafter. Shank 14 is provided with a bore 16 extending through the entire extent of shank 14 and may if desired extend partially into head 12, as indicated by the portion 17. In the present embodiment shank 14 is rectangular in shape and has an opening 18 extending transversely of said shank 14 and communicating with bore 16. Positioned within opening 18 are a pair of axially extending resilient elements or arms 22, which are integral with the lower portion of the walls forming shank 14 adjacent bore 16, extending upwardly towards head 12 but terminate in spaced relation thereto. The arms 22 are curved on their inner surface 23 and form a continuation of the bore 16 while their outer or peripheral sides extend laterally beyond the limits of shank 14. The extremities of arms 22 are each provided with a cam surface 24 with the cam surface 24 and the upper extremity 26 serving as shoulder means or surfaces. The shoulder means 26 are preferably spaced from the head a distance approximately equal to or slightly less than the thickness of the panel with which it is to be associated. As can be best seen in FIGS. 2 and 4 the upper extremities of arms 22 adjacent the head are relatively thick in a transverse or radial direction and taper down in thickness to the point at which they are resiliently attached to the remainder of the shank 14.

In operation the fastening device 10 is axially telescoped with a complementary non-circular aperture 29 in a first panel 30 with the arms 22 being flexibly moved inwardly during said insertion until the under surface of the head 12 comes into contact with the upper surface of panel 30. At this time the arms 22 flex outwardly so as to underlie the opposite surface of panel 30. With the fastener 10 preassembled to panel 30, the preassembly is brought into juxtaposed relation with a second apertured member 34 and a screw 36 is rotatably and axially telescoped within the aperture 35 in member 34 and with fastener 10. When the screw 36 is introduced into the bore 16 of the fastener 10 the screw shank tends to aggressively urge arms 22 outwardly into positive locked underlying engagement with the under surface of panel 30 as shown in FIG. 5. The non-circular or polygonal configuration of fastener shank 14 when inserted in complementary aperture 29 precludes the rotation of fastener 10 during insertion of screw 36.

As the head 12 is drawn into tight engagement with panel 30 its thin edges tend to deflect to conform with any surface irregularities and to thereby seal aperture 29. The extension 17 of bore 16 into the head 12 assists in providing flexibility in head 12 for accomplishing the aforesaid sealing of aperture 29 as well as providing clearance for possible screws which might be oversize in their axial dimension.

The fastener 10 is preferably an injection molded device formed of thermoplastic materials such as nylon, Delrin or polyethylene with the internal bore 16 either being smooth or being provided with female screw threads. In the present embodiment the bore 16 is smooth and a spaced thread screw 36 is illustrated whereby the screw will form its own mating thread on the interior of bore 16. It must be recognized that thread cutting or tapping screws are equally usable with this device. If female threads, not shown, were provided in the bore 16 a complementary machine screw can then be utilized. It has been found more economical and preferable, however, to utilize a smooth bore 16 and a mating thread forming or thread cutting screw therewith.

While only a single embodiment in the present invention has been disclosed in compliance with the requirements it is felt that other variations and embodiments will be apparent to those skilled in the art and it is my intent that I be limited only by the appended claim when read in conjunction with the specification.

I claim:

A one piece thermoplastic fastener adapted to accept a screw for mounting a first complementary apertured workpiece in spaced relationship to a second apertured workpiece, said fastener including an imperforate head, a non-circular shank depending from said head, said shank having an axially extending bore communicating with the terminal end of said shank opposite said head and traversing the entire axial extent of said shank and extending axially into said head and terminating adjacent the outer surface of said head opposite to said shank, said shank being relieved by a large transverse opening located in said shank at a position spaced from said terminal end of said shank and communicating with said bore, said opening being of substantially greater width than said bore, resilient arm means extending integrally from said shank toward said head and positioned within said opening, said arm means each having an inner surface defining an axial continuation of said bore and an outer surface tapering outwardly from the juncture of the arm means with the shank wall whereby the extremities of said arm means are thicker in radial transverse section than the transverse section of said arm means at their point of juncture with said shank wall, the extremities of said arm means providing shoulder means in spaced opposition to said head and at least a portion of said shoulder means extending laterally beyond the planes defining the outer surfaces of said shank, said arm means being adapted to flex inwardly into said bore during telescopic insertion of said shank into said first complementary non-circularly apertured workpiece and to flex outwardly after passing through said workpiece so as to overlie one surface thereof while the head engages the opposite surface of said workpiece, said bore being adapted to accept said screw when said screw has been telescopically moved through said second workpiece aperture for retaining the second apertured workpiece in juxtaposed relation to the terminal end of said shank and in spaced relation to said first workpiece, said arm means being locked in installed position when said screw fills said bore, said head being substantially larger in radial extent than the aperture in the first workpiece it engages, said head being tapered in thickness toward its outer periphery and relieved centrally by the extension of said bore whereby it is flexible and will intimately contact said panel at its periphery so as to seal the aperture that it surrounds.

References Cited

UNITED STATES PATENTS

| 2,360,647 | 10/1944 | Churchill | 24—21 |
| 2,386,922 | 10/1945 | Andrews et al. | 85—80 |
| 2,424,757 | 7/1947 | Klumpp | 85—80 |
| 2,784,865 | 3/1957 | Rieke | 85—80 |
| 3,069,962 | 12/1962 | Rapata | 85—82 |
| 3,280,875 | 10/1966 | Fischer | 85—83 |

FOREIGN PATENTS

| 1,111,742 | 11/1955 | France. |
| 1,216,512 | 11/1959 | France. |

MARION PARSONS, JR., *Primary Examiner.*